United States Patent [19]

Anderson

[11] Patent Number: 5,027,548
[45] Date of Patent: Jul. 2, 1991

[54] TOXIC DUSTING SYSTEM FOR RODENTS

[76] Inventor: Richard J. Anderson, 512 Pearce Rd., Pineville, La. 71360

[21] Appl. No.: 555,175

[22] Filed: Jul. 20, 1990

[51] Int. Cl.$^5$ .............................................. A01M 1/20
[52] U.S. Cl. ........................................ 43/131; 43/124
[58] Field of Search .................. 43/131, 124, 121, 107

[56] References Cited

U.S. PATENT DOCUMENTS

| | | | |
|---|---|---|---|
| 3,304,646 | 2/1967 | Staley | 43/131 X |
| 4,132,026 | 1/1979 | Dodds | 43/131 |
| 4,349,981 | 9/1982 | Sherman | 43/131 |
| 4,375,732 | 3/1983 | Waast | 43/131 |
| 4,541,198 | 9/1985 | Sherman | 43/131 |

Primary Examiner—Richard K. Seidel
Assistant Examiner—Patty E. Hong
Attorney, Agent, or Firm—Pravel, Gambrell, Hewitt, Kimball & Krieger

[57] ABSTRACT

An apparatus providing a tunnel-way for mice along a vertical surface including a first entrance way into a tunnel chamber having a flared open wall portion, the inner wall of which makes contact with a vertical surface. The walls forming a tunneling entrance into the tunnel-way. The tunnel-way is positioned intermediate the first and second entrance portions into the tunnel, so that a mouse would encounter the flared entrances to the tunnel-way and move into the tunnel from either direction. The tunnel further comprises material along its interior surface to make contact with the pelt of the mouse, as it moves therethrough. The interior material is provided with a toxic dust introduced into the tunnel which adheres to the material and is deposited onto the mouse as it moves therethrough. To introduce dust, a first open end of the tunnel is secured with a stopper, and dust shaken into the tunnel. The tunnel is then stopped on its second end, shaken, and upon removal of the stoppers, the dust contacts the material throughout the wall of the tunnel to contact the mouse as the mouse ran therethrough. There is also provided a shoulder portion between the entrance to the tunnel and the floor of the tunnel, so that any dust which is laying on the floor of the tunnel cannot move laterally because of the shoulder portion.

6 Claims, 2 Drawing Sheets

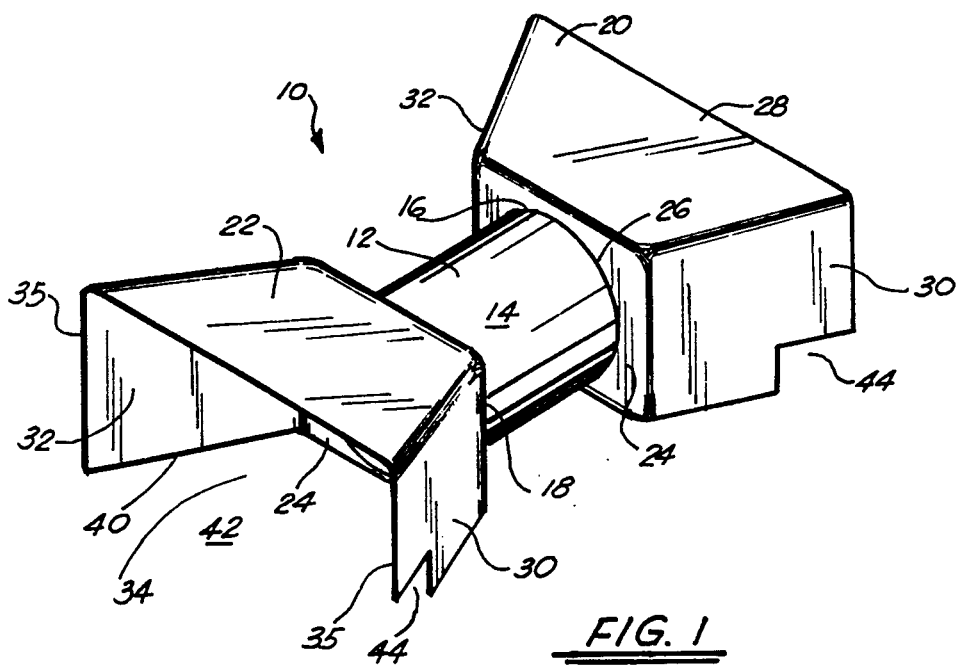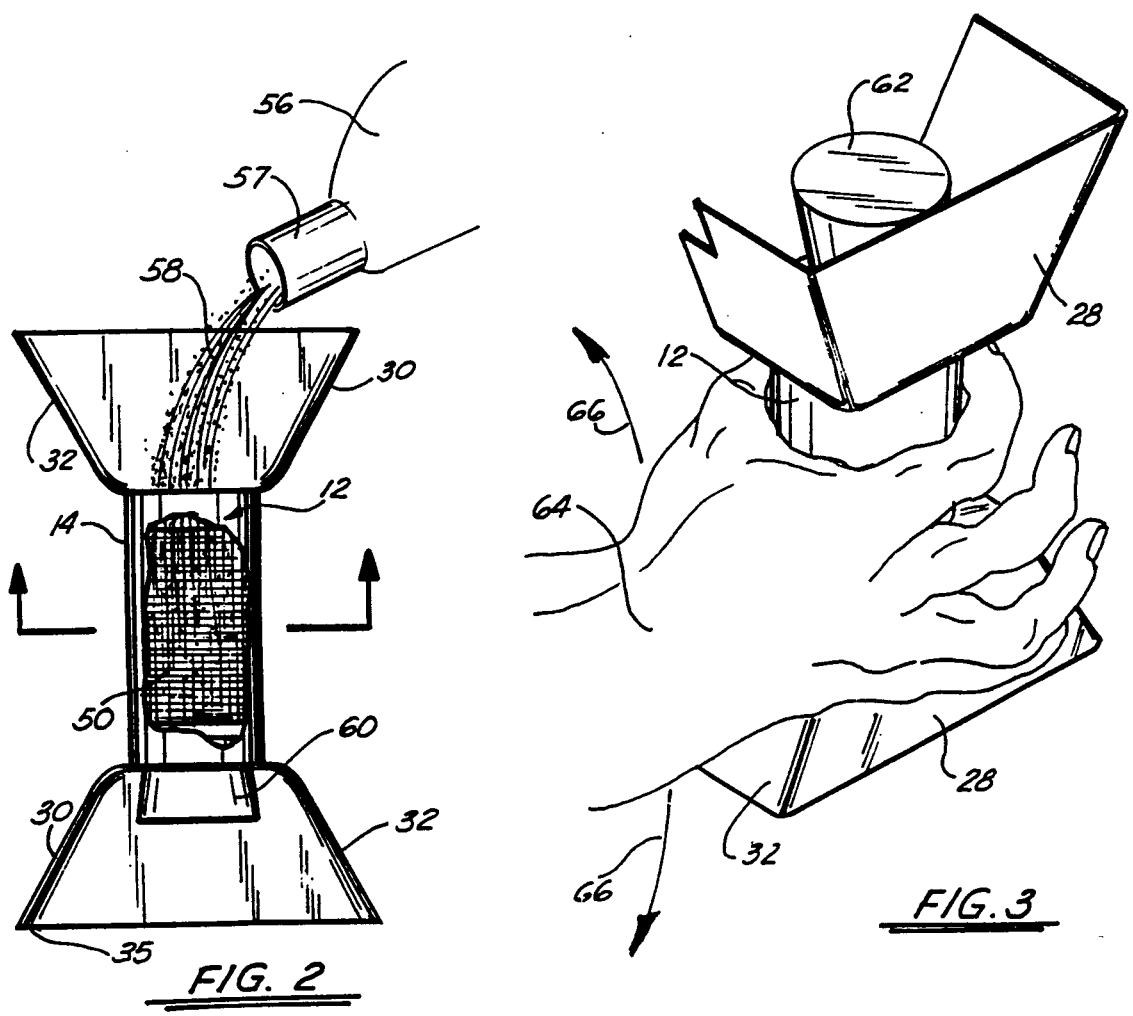

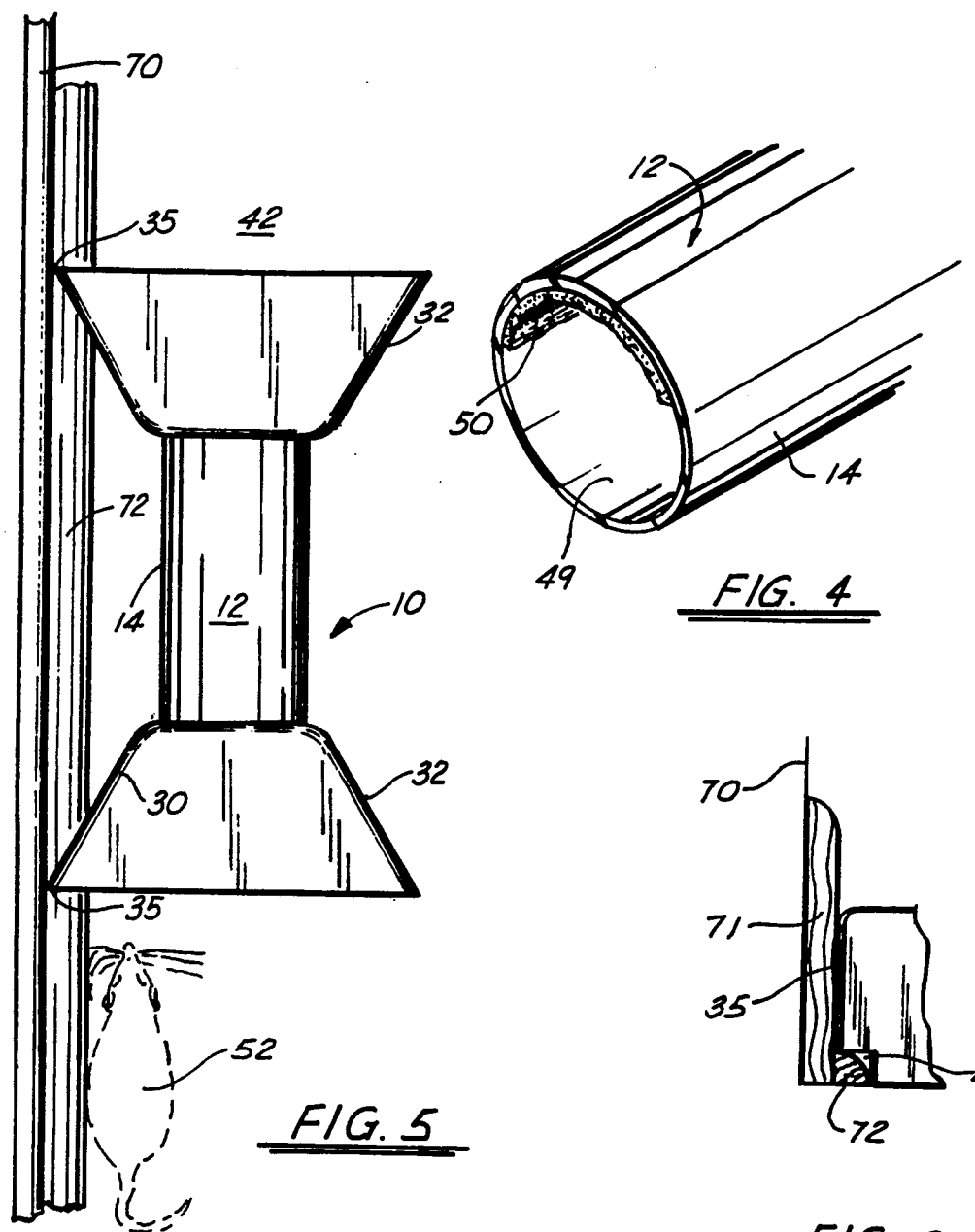
FIG. 4
FIG. 5
FIG. 6
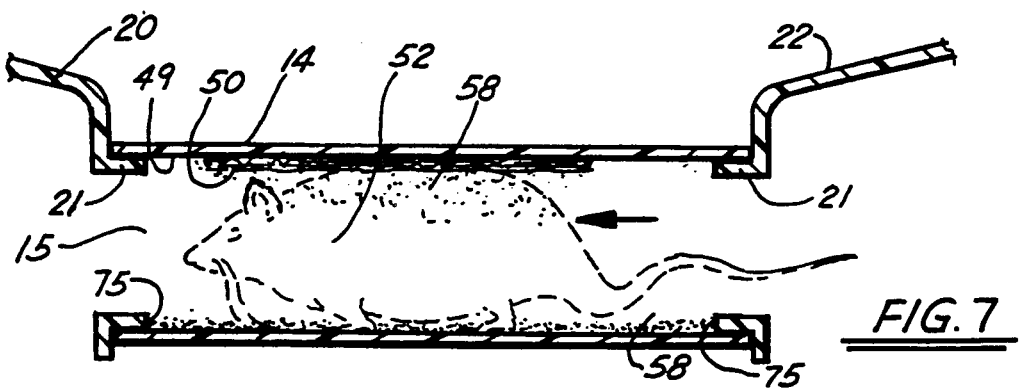
FIG. 7

TOXIC DUSTING SYSTEM FOR RODENTS

BACKGROUND OF THE INVENTION

1. Field Of The Invention

The apparatus of the present invention relates to rodents. More particularly, the apparatus of the present invention relates to a device which is positioned adjacent a wall or the like structure so that as a rodent, more particularly a mouse, encounters the device, the mouse is required to pass through a tunnel portion of the device, which has been pre-treated with a toxic powder, so that the mouse retains the powder on his coat, and upon returning to the nest and undergoing grooming by other mice, the entire nest would be eliminated.

2. General Background

Historically, mice have been a burden on man throughout the ages, in that they cause a great deal of damage to materials in buildings or the like. Because of their habits of nibbling, mice contaminate much of the material which they do not actually destroy. Furthermore, mice transmit diseases to man such as ratbite fever, weils disease, and the dropping of mice can carry organisms which cause food poisoning.

It has been found that mice, being creatures of habit, lack clear eye-sight, and are in fact nearly blind. Therefore, when a mouse enters a room, the mouse would utilize its whiskers to make contact with the wall of the room as it moves from place to place. Therefore, historically, when a mouse travels through a room, it would travel along the walls or along a boarder that the whiskers can maintain contact with so that the mouse is secure that he is following a particular pathway.

In the effort to eliminate mice, there have been what is known as "dust boxes" placed against solid vertical surfaces, that mice can encounter. However, such boxes should never be placed in open areas, as they would be accessible to children and pets. It is very important that there be a careful use of contact preparations and great care is required in the use of contact dust as they often contain a high concentration of rodenticide, which becomes air-born quite easily and contaminates food stuffs. At the present time dusts are frequently scattered in back of kitchen appliances and openly along walls making them accessible to children and pets and easily movable by air currents caused by fans, air conditioning, heating and opening and closing of doors.

In a search of the art, which may be pertinent to this particular apparatus, reference is made to the following patents:

| PATENT NO.: | PATENTEE: | TITLE: |
| --- | --- | --- |
| 2,683,953 | Hopkins | "Container For Rodenticide" |
| 4,132,026 | Dodds | "Simplified Blank Forming A Rodent Poison Container" |
| 4,753,032 | Sherman | "Contact Poison Delivery System" |
| 4,349,981 | Sherman | "Contact Poison Delivery Device" |
| 1,463,757 | French Patent | |
| De 3,627,150 | German Patent | |
| 3,304,646 | Staley | "Trap For Bugs And The Like" |
| 4,375,732 | Waast | "Device For Combatting Rodents" |

SUMMARY OF THE PRESENT INVENTION

The apparatus of the present invention solves the shortcoming in the art in a simple and straight forward manner. What is provided is an apparatus which is constructed so as to provide a tunnel-way for mice along a vertical surface such as a wall, with the tunnel-way including a first entrance way into a tunnel chamber, the entrance-way having a flared open wall portion, the inner wall of which makes contact with the vertical surface, with the likewise outer extending wall. The walls form a tunneling entrance into the tunnel-way. The tunnel-way would be positioned intermediate the first and second entrance portions into the tunnel, so that in either direction that a mice was moving, he would encounter the flared entrances to the tunnel-way and move into the tunnel. Maximum effectiveness would be achieved by positioning the device between a wall or cabinet and a kitchen appliances such as a refrigerator, freezer, stove, dishwasher, washer or dryer. Thus, allowing the mouse no alternative but to move through the device.

The tunnel would further comprise a material along its interior surface, side walls and roof, which would be of sufficient diameter to make contact with the coat of a mouse, as a mouse moves therethrough. The interior material would be provided with a toxic dust introduced into the tunnel, and after the dust is introduced, the dust would adhere to the material to be deposited onto the mouse as it moves therethrough. In introducing the dust into the tunnel, a first open end of the tunnel would be secured with a stopper, and dust would be shaken into the tunnel. The tunnel would then be stopped on its second end, shaken around, and upon removal of the stoppers, the dust would contact the material throughout the wall of the tunnel to make contact with the mouse.

There would be further provided a shoulder portion between the entrance to the tunnel and the floor of the tunnel, so that any dust which is laying on the floor of the tunnel would be unable to move laterally out of the tunnel, having encountered the stepped floor portion. Dust thus enclosed in the device would not be moved by air currents.

Furthermore, the inner wall of the portion of the wall of the apparatus making contact with the upright vertical surface would be notched on its lower corner so as to make accommodations for the corner molding along the edge at the juncture of most wall and floor portions.

Therefore, it is a primary object of the present invention to provide a system for having toxic dust adhere to the coat of a mouse, as a mouse passed through the apparatus;

It is a further object of the present invention to provide a toxic dust system for mice, which would include an entrance way for leading the mouse into the tunnel portion of the apparatus which has been dusted with toxic dust;

It is a further object of the present invention to provide a method of introducing toxic dust into the interior of an apparatus which will accommodate a mouse through the tunnel, and provide dust onto the coat of the mouse, so that when the mice groom each other, upon its return to the nest, the nest is destroyed.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a overall perspective view of the preferred embodiment of the apparatus of the present invention;

FIG. 2 is a partial cut-away view of the preferred embodiment of the apparatus of the present invention;

FIG. 3 is a view of the apparatus of the present invention as toxic dust is being distributed therethrough;

FIG. 4 is a partial end view of the tunnel portion of the apparatus of the present invention;

FIG. 5 is a top view of the preferred embodiment of the apparatus of the present invention situated along a vertical wall;

FIG. 6 is a partial cut-away view of the preferred embodiment of the apparatus of the present invention positioned along a vertical wall; and FIG. 7 is a side cutaway view of the preferred embodiment of the apparatus of the present invention illustrating a mouse moving therethrough.

DETAILED DESCRIPTION OF THE PREFERRED EMBODIMENT

FIGS. 1 through 7 illustrate the preferred embodiment of the apparatus of the present invention by the numeral 10. As illustrated, apparatus would include a central elongated circular tunnel portion 12 comprising an annular wall portion 14, the first end 16 of tunnel portion 12 and the second end 18 of tunnel portion 12, each attaching to an entrance portion 20 and 22 respectively. Turning now to entrance portions 20 and 22 respectively, reference is made to entrance portion 20 which would be identical to entrance portion 22 and therefore will be discussed as illustrative.

Entrance portion 20 would comprise rear vertical wall portion 24 which is sealingly secured at point 26 to tunnel portion 12 along its end portion 16. Furthermore, there would be included as top portion 28 extending outwardly from vertical wall 24 and a pair of flared side portions 30 and 32 likewise extending outward from rear wall 24 at an angle of preferrably 45 degrees from the straight line of the tunnel wall 14, to provide a flared entrance-way 34 as can be illustrated in FIG. 1. As noted in entrance portion 22, walls 30 and 32 would converge at the 45 degree angle to rear vertical wall 24, the function of which will be described further.

Furthermore, it should be noted that both of entrance-ways 20 and 22 respectively have no floor portion in view of the fact that the lower edge 40 of each of the side wall portions 30 and 32 would rest on a surface 42 such as the floor when the apparatus is placed in use. Furthermore, there is noted a pair of notched lower corner portions of 44 in each of the wall portions 30, the function of which will be described further.

Turning now to the interior of tunnel 12, reference is made to FIG. 2. In FIG. 2 there is seen in a cut-away view of tunnel 12 a material such as a fabric or screen 50, which would line the top and side wall of tunnel portion 12, and as seen in FIG. 7, would provide that any rodent such as rodent 52 moving through the tunnel passage-way 15 defined by wall 14, would make contact with the material 50 along entire surface of rodent 52 in order to collect the poison dust that would be placed therein.

Turning now to the method in which the device is prepared for use, again reference is made to FIG. 2, where there is illustrated a bottle 56 having a top portion 57 wherein a toxic dust or rodenticide 58 is being poured into the interior 15 of tunnel 12. As illustrated in FIG. 2, in order to assure that the dust 58 is maintained within the tunnel 12, a stopper 60 has been placed in the lower opening of tunnel 12, and has sealed off the opening while the dust 58 is being poured thereinto.

Turning now to FIG. 3, following the pouring of the dust into the tunnel portion 12, a second stopper 62 is placed on the upper end of tunnel 12, and the apparatus would be shaken by a human hand or the like 64 vigorously up and down in the direction of Arrow 66, so as to assure that the dust is thoroughly distributed within the confines of tunnel 12, and for the most part is adhering to the surface of the fabric 50 that is lining the inner wall of tunnel 12.

Following the shaking of the apparatus 10, reference is made to FIGS. 5 and 6, which illustrate in both top and partial views respectively, the fact that apparatus 10 has been positioned along a vertical wall 70, with the front edges 35 of vertical walls 30 being positioned along the vertical walls 70 and therefore closing off any possibility that mouse 52 can move by the apparatus as it is moving along wall 70. Likewise, there is illustrated that wall 70 includes a base molding 71, which is very common at the juncture between a vertical wall 70 and a floor 42, as illustrated in FIG. 5. In order to accommodate apparatus against wall 70, and not to allow rodent 52 from moving by apparatus 70, reference is made to FIG. 6 where there is again illustrated wall 70 having a base molding 71, and a corner-quarter round molding 72. As was discussed earlier, the notches 44 at the juncture of wall 30 and the floor, would allow the forward edge 35 of vertical wall 30 to fit snugly against molding 71, with the corner-quarter round molding accommodated within notch portion 44. Therefore, when mouse 52 encounters the apparatus, since the apparatus engages along wall 70 in such a close fashion, that mouse 52 has no other option but to follow the telescoping wall 30 into tunnel 12, and be thoroughly coated with the toxic powder 58 as illustrated in FIG. 7.

Further, as seen in FIG. 7, there is illustrated the manner in which the entrance portions 20 and 22 engage tunnel 12. As illustrated each of the entrance portions 20 and 22 have a circular shoulder portion 21 which engages into and is secured along the interior surface 49 of wall 14. Therefore, there is formed an entrance ledge 75 at both entrances to tunnel 12, so that as dust 58 is scattered along the floor portion or the interior wall 49 of the tunnel, ledge 75 prevents the dust from moving out of the tunnel when the apparatus is placed in position as seen in FIG. 5. Therefore, although a mouse may tend to drag some of the dust along, it is seen that as soon as the dust encounters ledge 75 it is maintained within tunnel portion 12, and therefore the only dust which would exit the apparatus is the dust which is attached to the mouse itself.

For purposes of construction, the apparatus may be constructed of a plastic material, and may be molded from a single unit. It is foreseen that the fabric within the tunnel would be a light-weight fabric having a porous structure so as to accommodate the toxic dust, and to assure that the dust is maintained on all portions of the material within the tunnel while the mouse encounters it.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for having a mouse encounter toxic dust during its travel, the apparatus comprising:

a) a tunnel portion having a wall, and a tunnel chamber therethrough, b) a first entrance portion, the entrance portion having a pair of side walls forming a flared entranceway into the tunnel, and a top portion, the top portion and side walls attached to the entranceway of the tunnel;

c) a second entrance portion, at the second end of the tunnel, likewise having a pair of flared side walls, a top portion, the flared side walls and top portion likewise attached to the end of the tunnel and defining an entrance way thereunto;

d) means for positioning the apparatus along a wall so that a vertical edge of each of the side walls of the apparatus encounters a vertical edge of a vertical wall; and e) fabric means positioned within the tunnel for allowing toxic dust scattered in the tunnel to adhere to the wall of the tunnel and to encounter the coat of a mouse as the mouse passes through the tunnel.

2. The apparatus in claim 1, wherein the apparatus is positionable upon a floor portion along a vertical wall.

3. The apparatus in claim 1, wherein the means for allowing the vertical edge of the wall portions to be secured along the vertical wall includes a notched portion on the lower corner of the apparatus for accommodating a corner-quarter round molding therethrough.

4. The apparatus in claim 1, wherein the toxic dust is introduced through one end of the tunnel portion while the second end of the tunnel portion is sealed.

5. The apparatus in claim 1, wherein the toxic dust is distributed throughout the tunnel portion after both ends of the tunnel portions have been sealed and the apparatus vigorously shaken.

6. An apparatus for dusting a mouse with powder that will adhere to the mouse after the mouse has moved through the apparatus, the apparatus comprising:

a) a tunnel portion defined by a continuous side wall having first and second open end portions;

b) a fabric secured to the interior side walls and ceiling of the tunnel portion for receiving a toxic dust scattered in the tunnel, so that the toxic dust adheres to the fabric on the side walls and ceiling of the tunnel and distributes the dust upon the coat of the mouse as a mouse passes through the tunnel;

c) a first entrance portion, defined by a pair of side walls forming a flared entrance way into the tunnel, and a top portion, the top portion and side walls defining a means for leading a mouse into the tunnel;

d) a second entrance portion, at the second end of the tunnel, likewise having a pair of flared sidewalls, a top portion, the flared sidewalls and top portion likewise serving as a means for guiding a mouse into the tunnel entrance way;

e) means for positioning the apparatus along a vertical wall, so that a vertical edge of each of the side walls of the apparatus encounters the vertical wall; and f) means for allowing the vertical edge of the wall portions to be secured along the vertical wall to accommodate a corner-quarter round molding therethrough.

* * * * *